(12) United States Patent
Gudaitis et al.

(10) Patent No.: US 6,626,603 B2
(45) Date of Patent: Sep. 30, 2003

(54) SCREW MOUNTING INSTALLATION AND APPARATUS

(75) Inventors: Charles Newell Gudaitis, Tammany Parish, LA (US); Richard Joseph Wright, River Ridge, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/095,146

(22) Filed: Mar. 11, 2002

(65) Prior Publication Data

US 2003/0021628 A1 Jan. 30, 2003

Related U.S. Application Data

(62) Division of application No. 09/690,964, filed on Oct. 18, 2000.
(60) Provisional application No. 60/210,136, filed on Jun. 7, 2000.

(51) Int. Cl.[7] .............................. F16B 11/00; F16C 9/00; F16D 1/00; B23P 25/00
(52) U.S. Cl. ..................... 403/30; 403/404; 403/408; 29/458
(58) Field of Search ......................... 29/458, 428, 717, 29/718; 403/30, 434, 408, 28, 29, 337, 404, 373

(56) References Cited

U.S. PATENT DOCUMENTS

| | | | | |
|---|---|---|---|---|
| 3,826,088 A | * | 7/1974 | Nash et al. ............... | 60/766 |
| 4,270,871 A | * | 6/1981 | Grise ....................... | 403/29 |
| 4,299,018 A | * | 11/1981 | Bickerstaff et al. ....... | 492/45 |
| 5,427,334 A | | 6/1995 | Rauscher, Jr. ............ | 244/135 |
| 5,441,219 A | | 8/1995 | Rauscher, Jr. ............ | 244/135 |
| 6,171,009 B1 | | 1/2001 | Wright .................... | 403/30 |

\* cited by examiner

*Primary Examiner*—John C. Hong
(74) *Attorney, Agent, or Firm*—Duane Morris LLP

(57) ABSTRACT

A method is described for installing a stud to extend above a surface of a composite portion of a tank or other structure subject to the pressure of cryogenic fluid, so that another structure can be attached to the stud. The method includes drilling a through aperture at the location of the stud, and installing a threaded insert near the outer surface of the aperture, if not already installed. A metal bolt having a CTE less than that of the composite material is selected. The bolt has an unthreaded shank portion and a threaded portion. The length of the bolt exceeds the length of the projecting stud and the thickness of the composite. The bolt is assembled with a commercial k seal, a collar having a CTE much less than that of the bolt, and another k seal. The seals mate with corresponding frustoconical surfaces of the composite and of the collar, and when the bolt is properly torqued to a preload, prevent leakage. The assembly and torquing may be done at room temperature, and the CTE compensation aspects of the combination results in maintaining a preload over the entire range of temperatures. The preload not only aids in maintaining a seal, but acts to prevent delamination of the composite (210).

7 Claims, 9 Drawing Sheets

SCREW MOUNTING INSTALLATION AND APPARATUS

This application is a divisional of U.S. patent application Ser. No. 09/690,964, filed Oct. 18, 2000.

This patent application claims priority of provisional patent application Serial No. 60/210,136 filed Jun. 7, 2000.

FIELD OF THE INVENTION

This invention relates to the fabrication of jointed structures for operation under cryogenic conditions, and more particularly to extending a threaded stud above a laminated composite material so that another structure can be fastened to the stud.

BACKGROUND OF THE INVENTION

The problem to which the invention is directed arose in the context of fabrication of propellant tanks for space vehicles. In spacecraft, the launch weight is of primary importance, as every ounce of excess weight which can be removed from fixed structure can be used for storage of propellant, to thereby provide a longer operational lifetime. Thus, all parts of a space vehicle and its launcher are subject to intense efforts to reduce weight. The propellant storage tanks are prime subjects for weight reduction, as they tend to be among the largest structures on the spacecraft and/or its launcher. Past efforts at weight reduction of propellant tanks have led to innovations such as the use of laminated composite materials, made from multiple layers of strong, light fibers, such as graphite or carbon fiber, impregnated with a polymer. Many techniques are known for fabricating such tanks, as described, for example, in U.S. Pat. Nos. 5,427,334, issued Jun. 27, 1995 in the name of Rauscher, Jr., and 5,441,219, issued Aug. 15, 1995 in the name of Rauscher, Jr., which deal with fabrication of composite tanks having integral structures such as pipes and flow control devices.

A major problem with the application of composite materials to the storage of propellants in a spacecraft context is that the propellants are often cryogenic fluids, and some of the fluids, such as hydrogen, have very small molecules. The composite materials tend to have relatively large coefficients of thermal expansion in directions perpendicular to the reinforcing plies, so that relatively large changes in dimensions of the composite structure tend to occur when propellant is introduced into the tank, and then when the propellant is withdrawn. In the case of relatively small tanks, the plumbing required to carry the propellant to the engine may be made integral with the tank, as described by Rauscher, Jr., but large tanks require removable structures, such as hatches for ingress and egress, and flange attachments for attaching large-diameter pipes associated with large propellant flux.

FIG. 1a is a simplified plan view of the upper portion 10 of a prior-art propellant tank having an outer surface 10os, showing a central aperture 12 surrounded by a ring 14 of threaded apertures, some of which are marked 14a, 14b, and 14c. Both aperture 12 and the ring 14 are concentric with an axis 8. The central aperture 12 may be for any purpose, such as ingress or egress of personnel, or for flow of fuel. FIG. 1b is a perspective or isometric view of a portion of a propellant pipe 16 with a flange 18 which defines a ring 20 of apertures 20a, 20b adapted to fit over, and register with, the threaded apertures of ring 14, for accommodating bolts for connecting pipe 16 to the aperture 12 of upper tank portion 10 of FIG. 1a. For completeness of understanding, bolts 22a and 22b of a set of 22 of bolts is illustrated adjacent flange 18. Each bolt 22a, 22b, . . . of set 22 of bolts is threaded to match the threads of one of the threaded apertures 14a, 14b, . . . of ring 14 of threaded apertures.

FIG. 2a is a cross-section of upper tank portion 10 in a region near threaded aperture 14a of FIG. 1a. In FIG. 2a, the outer surface 10os is at the top of the FIG., and the inside surface 10is is at the bottom. The thickness of the laminated composite material is selected to be as thin as possible for weight reduction, but thick enough to withstand the forces associated with the mass of the propellant being stored, the anticipated acceleration, the safety factor, and possibly other factors or considerations. Among these other considerations is that of preventing leakage of propellant directly through the composite material. Considering that a propellant may have molecules as small as hydrogen, which is notorious for its ability to leak through the most minute apertures, the thickness of the laminated composite must be adequate to reduce leakage to an acceptable level. As illustrated in FIG. 2a, the threaded aperture 14a includes threads 214t defined in a metallic insert 214. Metallic insert 214 is fastened into a portion of a cylindrical aperture 215 centered on a local axis 208, either adhesively, by a force-fit, or both. The threaded end of bolt 22a extends into the threads 214t. An additional aperture portion 215a extends below the cylindrical aperture 215, for accommodating a bolt length which, when torqued, extends below threaded insert 214. It has been discovered that the tension applied to the insert 214 during torquing of the bolt 22a when fastening flange 18 of FIG. 1b to tank outer surface 10os has the potential to cause delamination, as illustrated by delamination cavity 220 in FIG. 2b. Such delamination can also result from the use of a bolt which contacts the bottom portion 215b of aperture 215 during torquing. In addition, delamination can result from lateral forces applied to the head end of a bolt threaded into the insert 214. Thus, there are many possible causes of delamination. Delamination, by its nature, is not well controlled, since it literally involves disintegration, or the breaking up of an integral or monolithic material, at least in a local region. The damage associated with delamination may extend toward the inner surface, and compromise the ability of the tank to contain propellant.

The large tanks which are fabricated to carry propellant for a launch vehicle or space vehicle are expensive items. Delamination damage to the apertures 215 of FIG. 2a, as illustrated in FIG. 2b, must be repaired in a suitable manner, or the entire tank discarded. These repairs are rendered difficult by the need to seal against egress of the cryogenic propellant regardless of the changes in dimension of the laminated composite due to its coefficient of thermal expansion as it makes the transition between room temperature (or above) and cryogenic temperatures.

Improved composite tank fabrication and repair are desired.

SUMMARY OF THE INVENTION

A method according to an aspect of the invention is for fastening a threaded stud to project above a first surface of a composite laminate in a substantially leakproof manner as to cryogenic liquid gases. The laminated composite structure is undesirably subject to crushing above a predetermined pressure and delamination under excessive tension perpendicular to the plies. The method comprises the step of forming a through aperture through the composite material at the location at which the stud is to be installed. The through aperture should have a first diameter adjacent the first surface of the composite laminate, a frustoconical surface in the form of the frustum of a cone lying adjacent a second surface of the composite laminate, and a second diameter, smaller than the first diameter, in a region lying between the frustoconical surface and the portion of the aperture having the first diameter. An internally threaded insert is installed from the first side into the aperture so as to fasten the insert within the portion of the aperture having the first diameter. A bolt is obtained which includes a head, a nonthreaded shank portion adjacent the head, and a threaded portion remote from the head. The threaded portion of the shank should mate with the internal threads of the insert. The bolt is made from a material having a known coefficient of thermal expansion which is less than or lower than the coefficient of thermal expansion of the laminated structure. A generally cylindrical collar is obtained. The collar should be made from a material having a particular coefficient of thermal expansion and a thickness or length in an axial direction. In one particular embodiment of the invention, the coefficient of thermal expansion of the collar is ideally near zero. The collar so obtained should have a bore about its axis no greater in diameter than the diameter of the nonthreaded shank of the bolt, and the collar should also have an overall diameter about the axis which is no less than the diameter of the cone adjacent the second surface of the laminated composite. The collar should further have a planar first end surface orthogonal to the axis, and a second end surface. The second end surface should include a peripheral planar annulus parallel with the surface of the first end, and also include a depressed frustoconical portion in the shape of the frustum of a cone depressed below the planar annulus. According to an aspect of the method, a first seal, which in a preferred embodiment of the invention is a "k" seal, is assembled onto the bolt, with the conical or frustoconical portion of the first k seal facing away from the head of the bolt. The collar (or a plurality of such collars) is then assembled onto the bolt, with the depressed portion of the collar facing the first k seal. A second seal, preferably a k seal, is placed on the bolt, with the conical portion of the second k seal facing away from the first surface of the collar, to thereby generate an assembled bolt. The assembled bolt is inserted through the aperture from the second side of the laminated composite, and threaded through the insert, so as to cause a portion of the threaded portion of the bolt to protrude from the first side of the laminated composite. In that case in which the coefficient of thermal expansion of the collar is selected in conjunction with the coefficient of thermal expansion of the bolt and with the thickness of the laminated composite in such a manner that the pressure applied to the laminated composite by the bolt does not change substantially over the expected temperature range, the bolt is torqued into the insert to achieve a pressure in the laminated composite which is less than the pressure at which the composite laminate crushes. The torque should be sufficient to deform the k (or other) seals sufficiently to seal against the pressure of the propellant.

In a particular mode of the method, the aperture in the laminated composite is formed by drilling from one of the first and second sides, and the laminated composite is supported from the other one of the first and second sides to aid in preventing delamination during the drilling. In another mode, the drilling is accomplished at the slowest drill feed rate at which reasonable cutting occurs, in order to reduce drill thrust loading. In another mode, the frustoconical portion of the aperture is formed to a 120E included angle, and the collar includes a conical bore portion with a 120E total included angle. The depressed conical portions are preferably polished. In one version, a countersunk region surrounds the conical portion of the aperture. Adhesive is preferably placed on the threads before the bolt is threaded into the insert. Before the bolt is torqued, it may be desirable to clean at least the frustoconical portion of one of the aperture and a corresponding conical portion of the second k seal. The adhesive, if any, should be cleaned from exposed portions of the threads.

A structure according to an aspect of the invention includes a laminated composite with a threaded stud extending from a first side thereof. The structure includes a through aperture in the laminated composite. The through aperture defines an axis, and includes a first portion adjacent the first side of the laminated composite. An internally threaded insert is fastened in the first portion of the through aperture. The through aperture further includes a second portion adjacent a second side of the laminated composite. The second portion has a frustoconical surface (a surface in the form of a portion of a cone) depressed below the second surface of the laminated composite. The structure includes an annular collar defining an axial bore coaxial with the axis, a first end surface perpendicular to the axis, and a second end defining a planar annulus centered on the axis. The collar also defines a frustoconical surface depressed below the second end annulus. A bolt includes a head, a nonthreaded shank adjacent the head, and a threaded portion remote from the head. The bolt is assembled with the laminated composite coaxial with the aperture, the collar, and two k seals having frustoconical surfaces. The parts are assembled so that (a) the first k seal lies between the head and the second end of the collar, with the frustoconical portion of the first k seal mated with the depressed frustoconical surface of the collar, (b) the second k seal lies between the first end surface of the collar and the frustoconical surface of the second portion of the through aperture, with the frustoconical portion of the second k seal mated with the frustoconical surface of the second portion of the through aperture, and (c) the threaded portion of the bolt threaded through the internally threaded insert sufficiently to extend above the first surface of the laminated composite.

In a particular version of the structure, the material of the laminated composite has a coefficient of thermal expansion which exceeds that of the material of the bolt, so that the pressure exerted by the bolt on the laminated composite will tend to increase with increasing temperature. In this embodiment, the collar(s) is (a) made from a material, and (b) has a length selected (i) in conjunction with the length of the bolt lying within the laminated composite, (ii) the material of the bolt, and (iii) the material of the laminated composite, so that the pressure applied to the laminated composite by the combination of the bolt and the collar tends to remain constant with temperature. In one embodiment, the collar(s) may have a coefficient of thermal expansion near zero. In this particular version of the structure, the bolt is torqued sufficiently to apply pressure to the laminated composite which is less than that pressure at which the laminated composite crushes. The pressure will remain more or less constant over the temperature range from room temperature to cryogenic temperatures.

A further avatar of the structure comprises adhesive lying in the interstice between the internal threads of the insert and the threads of the bolt. In a preferred embodiment, the unthreaded portion of the shank of the bolt is polished. Also, at least one of the depressed frustoconical surface of the collar and the depressed frustoconical surface of the aperture is polished. A region surrounding the frustoconical surface of the aperture may be countersunk below the second surface of the laminated composite.

In a further avatar of the invention, a bolted structure includes a containment barrier defining a containment vessel suitable for use with cryogenic fluids. The containment barrier further defines first and second surfaces, and a through aperture extending between the first and second surfaces. The through aperture is dimensioned to clear the shank of a bolt. A bolt is included. The bolt includes a head, an unthreaded shank portion, and a threaded shank portion. The bolt extends through the through aperture from one of the first and second surfaces in such a manner that at least the threaded portion of the bolt protrudes past the other one of the first and second surfaces. The bolted structure also includes a CTE collar including a bore having a diameter selected to clear the shank of the bolt. The bore of the collar is penetrated by at least a portion of the shank of the bolt. A nut is threaded onto at least a portion of the threaded portion of the bolt, and the nut is torqued relative to the bolt to provide a predetermined tension in the shank of the bolt. The bolted structure also includes one of (a) a seal interposed between, and in immediate contact with, the head of the bolt and that portion of the one of the first and second surfaces of the barrier which meets sealing standards for the seal;

(b) a seal interposed between, and in immediate contact with, the nut and that portion of the one of the first and second surfaces which meets sealing standards for the seal; and (c) a first seal interposed between an end surface of the collar and that portion of one of the first and second surfaces which meets sealing standards for the seal; and a second seal interposed between a second end surface of the collar and a surface portion of another structure.

BRIEF DESCRIPTION OF THE DRAWING

FIGS. 3b and 3c are similar;

DESCRIPTION OF THE INVENTION

As described in U.S. patent application Ser. No. 09/175,707, filed Oct. 20, 1998 now U.S. Pat. No. 6,171,009 in the name of Wright et al., one of the problems with the use of composites on spacecraft or aircraft is that of the relatively great coefficient of thermal or temperature expansion (CTE) of composites relative to other materials, such as steel, especially in a direction perpendicular to the reinforcing strands or plies. This problem is particularly acute, even in terrestrial applications, when the composite materials are used in or about cryogenic materials such as liquid hydrogen. The structure including the composite materials must initially be fabricated at temperatures at which humans can work, and may then be subject to extreme temperatures, such as −423° F. (−253° C.), when filled with cryogen. Extremely high temperatures may also be encountered under other conditions. The CTE of composite materials such as carbon-fiber reinforced polymer is large relative to other materials, such as steel, and its resistance to crushing forces is much lower.

When a steel screw or bolt is used with a nut to fasten together two structures, such as a hatch on a port of a pressure vessel, where both are made from composite material, the assembly is performed at room temperature, and if the nut is tightened to provide a force which is just below the force which would crush the composite material, the joint will loosen at cryogenic temperatures because the composite contracts more than the bolt. If the joint is exposed to a temperature significantly higher than room temperature, the joint will be crushed, because the composite material expands more than the bolt. Belleville washers are sometimes used to maintain tension in such structures, but tensioning the washer increases the tension in the bolt beyond that required for simply tightening the joint, thereby requiring a larger-diameter, and hence heavier, bolt. Also, Belleville washers must undesirably be carefully designed to the application. Another factor tending to negate the use of Belleville washers is that conventional seals suitable for cryogenic temperatures don't match their surface characteristics, and so cannot properly seal.

Figure 3A:
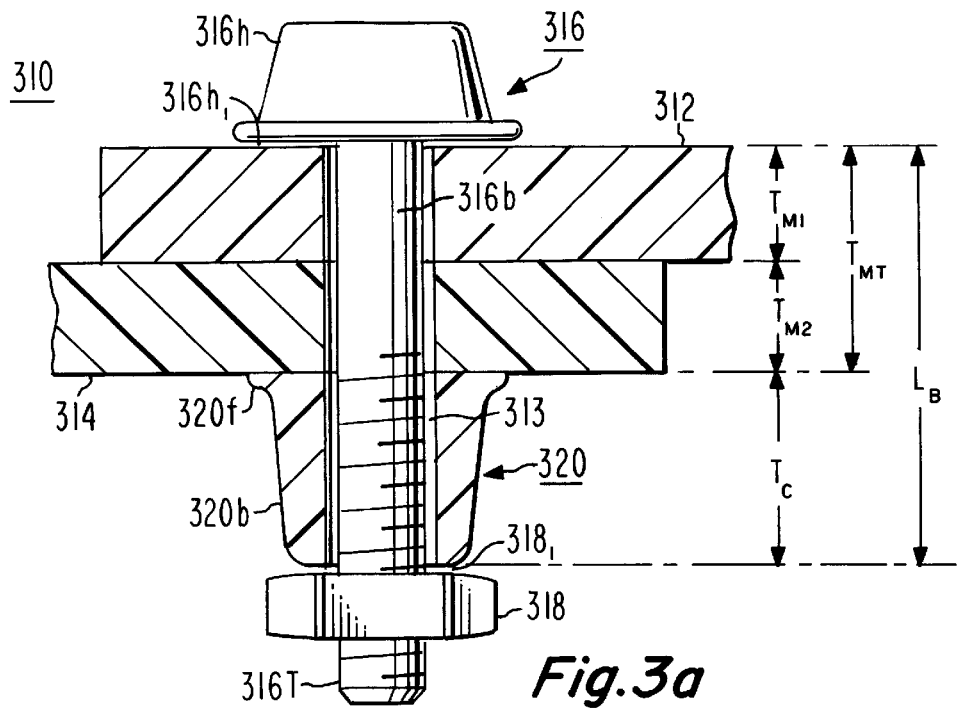
FIG. 3a is a simplified partial cross-section of a joint as described in a patent application of Wright.

FIG. 3a illustrates a joint 310, in which a first sheet of composite material 312 is juxtaposed with a second sheet of composite material 314. The thickness of sheet 312 is $T_{M1}$, and the thickness of sheet 314 is $T_{M2}$. The overall thickness of the juxtaposed sheets 312 and 314 is designated as $T_{MT}$. A fastener 316 includes a head 316h, a body 316b, a portion of which is threaded and designated 316T, and a nut 318 with matching threads. As illustrated in FIG. 3a, the body 316b of fastener 316 extends through an aperture 313 extending through both sheets 312 and 314, with its head abutting the upper surface of sheet 312. A collar 320 includes a body portion 320b and a flange portion 320f. The flange portion 320f of collar 320 abuts the lower edge of sheet 314. Nut 318 is tightened against the body portion 320b of collar 320, to thereby apply force which tends to compress the material of sheets 312 and 314 between the head 316h and the flange 320f of collar 320. Those skilled in the art know that composite materials can be crushed when the pressure or strain (force times area) exceeds a critical amount. Nut 318 is tightened until the tensile force in body portion 316b of fastener 316 is at a suitable value, which is less than that which crushes the material of sheets 312 and/or 314.

It is desirable that the fastener be strong. For this purpose, the fastener 316, 318 of FIG. 6a will often be made from steel. Steel has a coefficient of thermal expansion or coefficient of temperature expansion (CTE) which is substantially less than that of the composite material. The exact temperature coefficient of the individual sheets 312, 314 of composite material relative to each other is not particularly relevant. Instead, the CTE of the material in total thickness $T_{MT}$, taken as a whole, must be considered. If the materials of the juxtaposed sheets 312 and 314 are the same, then the CTE of the two layers equals that of either sheet alone. If the sheets are of disparate materials, the total CTE will be a weighted average of their coefficients of thermal expansion, based on their relative thicknesses.

Figure 3B:
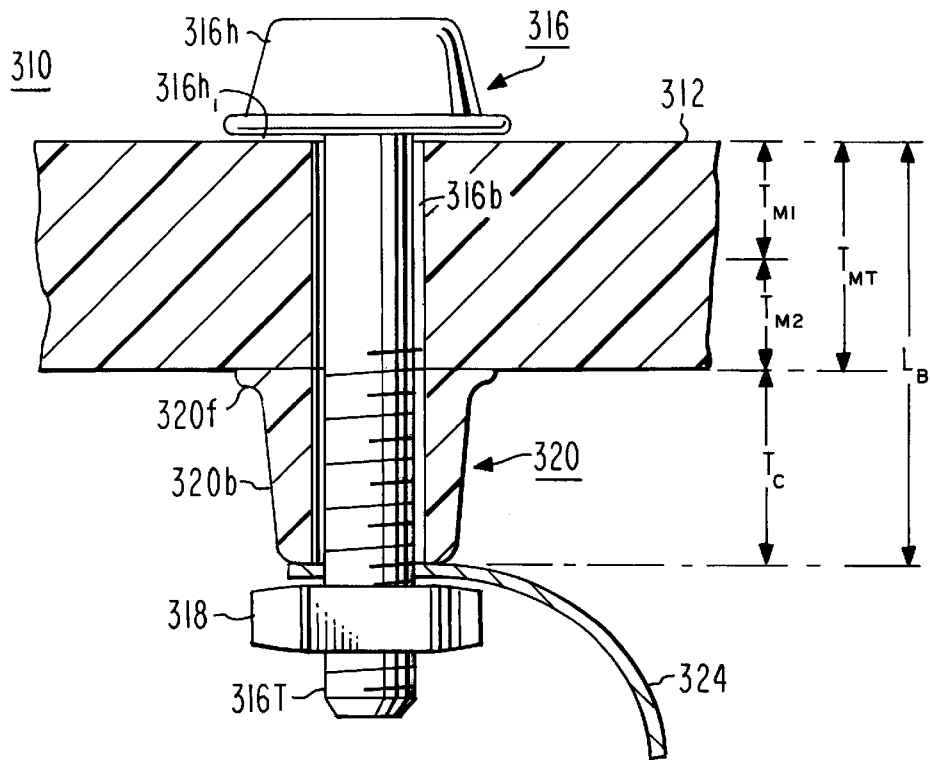

If the joint 310 of FIG. 3a is assembled and tightened at room temperature without the collar 30, the differential expansion of the sheets 312, 314 relative to that portion of the body 316b of fastener 316 lying between the facing sides 316$h_1$ and 318$_1$ of the head 316h and the nut 318, respectively, the length of which is designated $L_B$ in FIG. 3b, will cause the joint to tighten when the joint temperature increases, and to loosen when the temperature decreases. The joint tightens (the force in body 316b increases) when the joint becomes warmer because the composite material expands at a rate of increase greater than the rate of expansion of the body 316b.

As described in the Wright application, the collar 320 is located between the nut and the bottom layer of sheet 314. The material of the collar is selected to have a small, or preferably zero, CTE over the temperature range of interest. One suitable material for use with a steel fastener and carbon-fiber-reinforced polymer is INVAR. The thickness or axial dimension $T_C$ (in a direction parallel to dimension $L_B$ in FIG. 3a) is selected to extend the dimension $L_B$ of the body of the fastener to a value which provides the same amount of expansion as the given thickness of composite material, notwithstanding the lesser CTE of the fastener. This can be readily understood by imagining that the CTE of the fastener 316, 318 of FIG. 3a is exactly half the CTE of the composite material 312, 314 lying in thickness $T_{MT}$. The axial dimension $T_C$ of the collar 320 is selected so that the length of the body 316b of the fastener which lies between the facing surfaces 316$h_1$ and 318$_1$ of the nut 318 and the head 316h, respectively, is exactly twice the thickness $T_{MT}$. Looking at it another way, over any given temperature range, a fastener having twice the length, but half the CTE, of the composite material which it fastens, will have equal absolute value of thermal expansion (or contraction). In general, of course, the CTEs will not be in exact ratios, and the length of fastener between the facing surfaces of the nut and head must be determined analytically.

When a joint 310 having the lengths and CTEs selected as described above is assembled at a temperature within the range, and tightened to a particular value, it will neither tighten nor loosen over the complete temperature range, but rather will maintain about the same tension in the body 316b of the fastener.

Figure 3C:
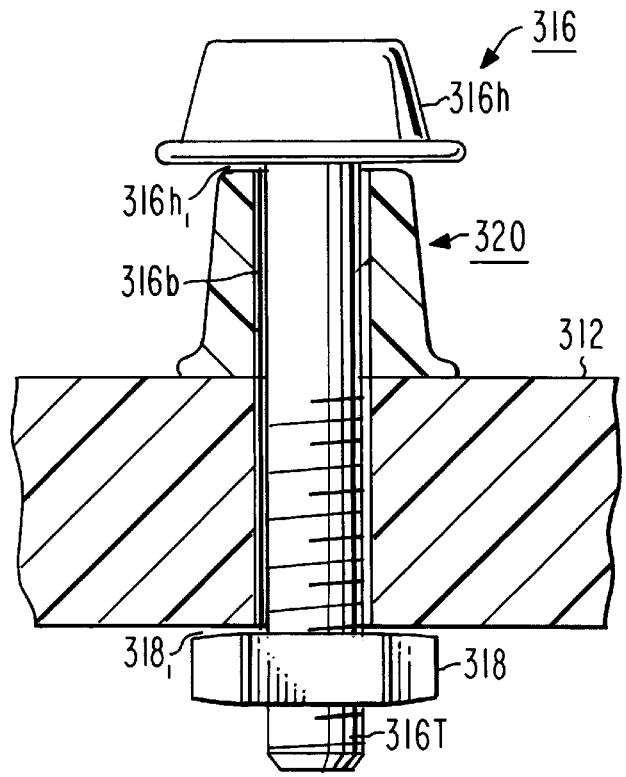

FIG. 3b is similar to FIG. 3a, but has a single sheet 312 of composite material, to which a coupling tab 324 is fastened by fastener 316, 318. FIG. 3c illustrates another version described by Wright in which collar 320 is located between the head 316h of fastener 316 and the layer 312 of composite material.

Figure 4:
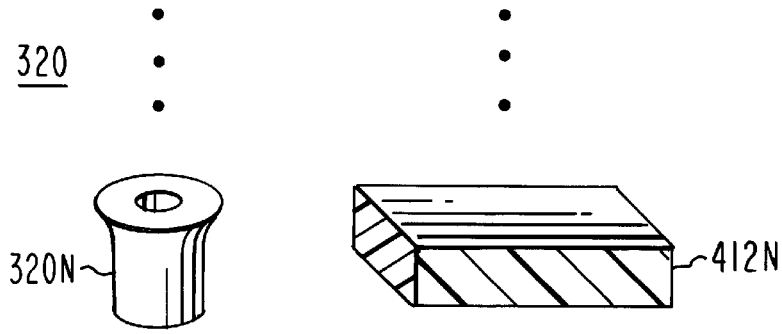
FIG. 4 illustrates a set of different collars as described by Wright, each for use with a sheet of particular material of different thickness and a fastener of particular material.
Figure 5:
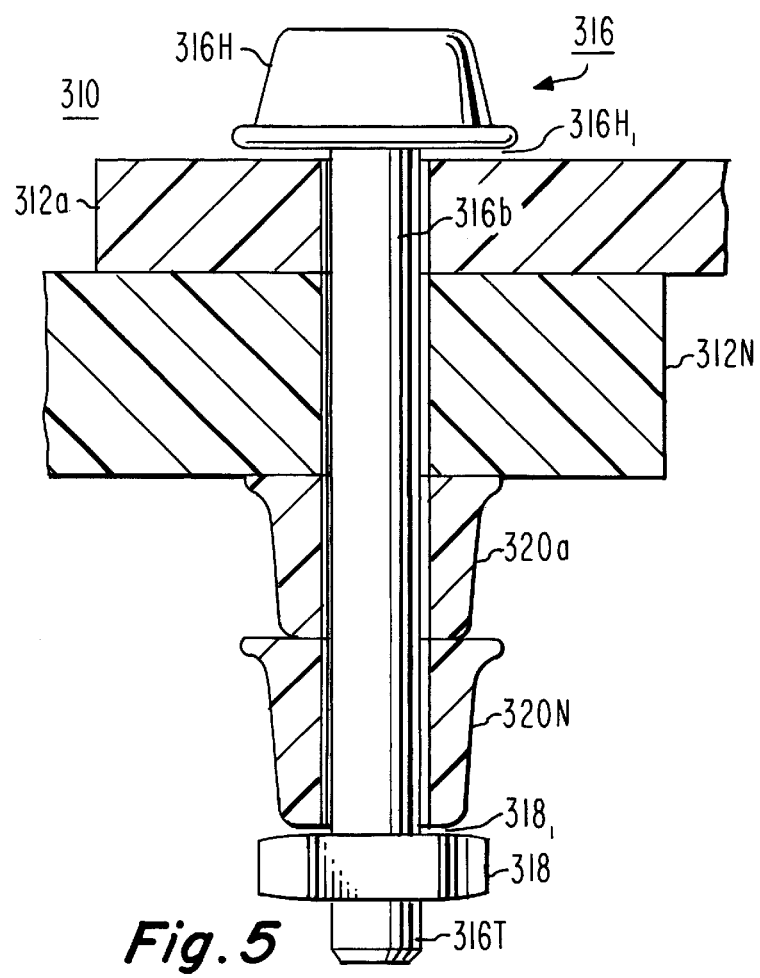
FIG. 5 is a simplified partial cross-section of a joint as further described in Wright, in which multiple sheets of different thicknesses are assembled with plural corresponding collars.

FIG. 4 is an illustration of a set 320 of low- or zero-CTE collars 320a, . . . , 320N according to a particular hypostasis described by Wright. The axial dimensions of collar 320a of set 320 are selected to provide CTE compensation of a sheet 412a of particular composite material of a particular thickness with a steel fastener. Other collars (illustrated by ellipses in FIG. 4) of set 320 are of axial dimensions selected for CTE compensation of other sheets (also illustrated by ellipses) of the same material, but of different standard thickness. The last collar of set 320, namely collar 320N, has its dimensions selected to compensate CTE of the thickest standard sheet 412N for use with a steel fastener. The standard thickness sheets may be, for example, 1/16". 1/8", 3/16". 1/2", etc. Other thicknesses may be selected as being the standard, and those thicknesses may be expressed in decimal form (1/2"=0.5") or in metric measurements. By having a set of such collars, each providing compensation for particular thicknesses of a given material with a given other material fastener, joints can be assembled and temperature compensated without extensive calculation or individual fabrication of various collars. When assembling a joint including one thin layer, such as layer 412a of FIG. 4, with one layer of thick material, such as layer 412N, the joint can be assembled with one collar 320a of the set, and one collar 320N, as illustrated in FIG. 5. Naturally, more collars of appropriate thickness would be used when other sheets of material were joined.

According to an aspect of the invention, a stud protruding from the outer surface of the composite-material tank is made by means of a bolt threaded from the inner surface and through a threaded insert, conjoined with appropriate seals and a CTE collar for maintaining pressure on the seals over the temperature range.

Figure 2A:
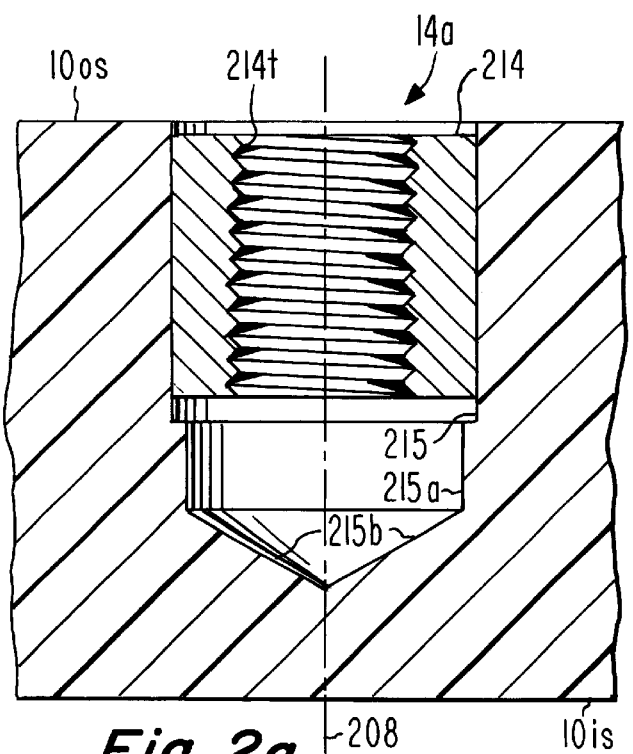
FIG. 2a is a simplified cross-section of a portion of the tank top of FIG. 1a, showing the use of internally threaded inserts for accepting mounting bolts associated with the flange of FIG. 1b.
Figure 2B:
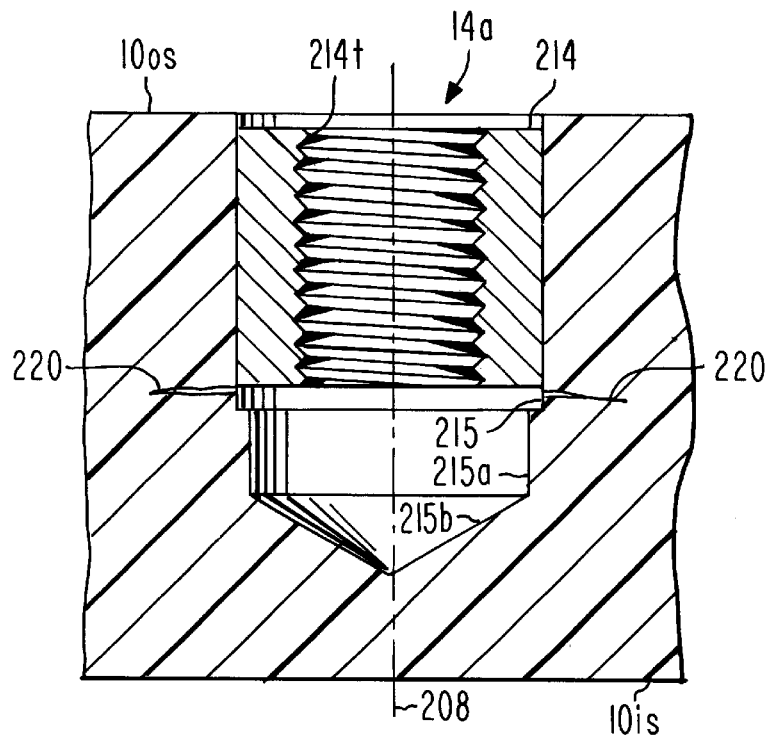
FIG. 2b is a simplified illustration of the delaminating effect which may be attributable to the use of a bolt.
Figure 6C:
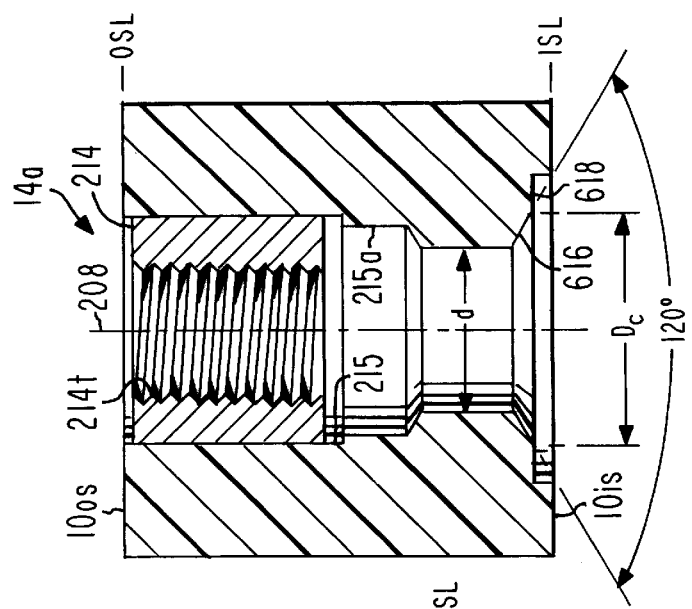
FIGS. 6a, 6b, and 6c illustrate various steps taken in preparing a delaminated a threaded aperture such as that of FIG. 2a for repair according to an aspect of the invention.
Figure 6B:
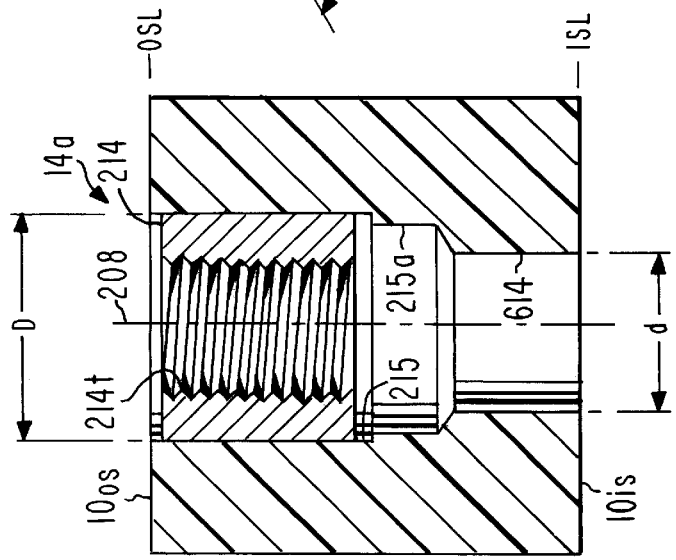
Figure 6A:
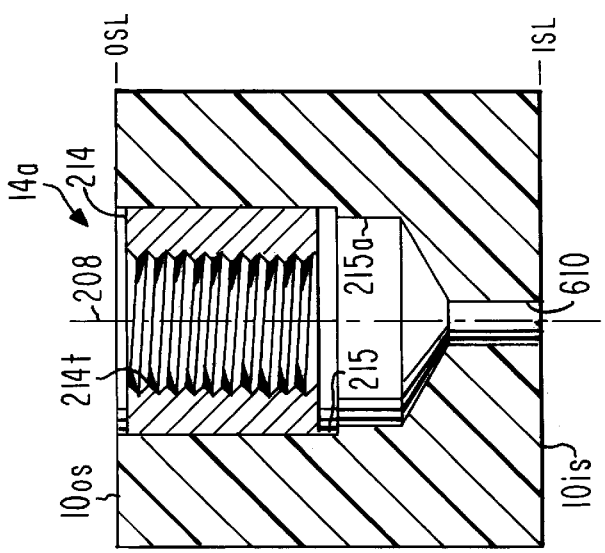

FIG. 6a illustrates a cross-section of a portion of the threaded aperture in which a delamination is to be repaired in accordance with an aspect of the invention. In FIG. 6a, elements corresponding to those of FIG. 2 are designated by like reference numerals. In FIG. 6a, a pilot hole 610 is drilled concentric with the threaded aperture. It should be noted that in a particular tank coverplate repair, many of the surfaces are polished machine sealing surfaces which should not be handled or used for mounting the part for machining. In order to avoid the possibility of delamination attributable to the force of the drill, the back of the drilled area (the lower surface 10is) should be supported to resist thrust loading by the drill. Also, the drill should be fed as slowly as practical while continuing to cut, so as to further reduce the applied thrust. Ideally, the pilot drill should have a shank diameter slightly less than the inside diameter of the threads of the insert, as determined by gage pins. After the pilot hole is made, it may be reamed to a slightly larger size to assure concentricity and perpendicularity to the inside (10is) and outside (10os) surfaces. Following the step illustrated in FIG. 6a, the cover plate is turned over and refixtured, and the through hole 614 is bored to a dimension greater than that of the shank of the bolt to be installed. The next step in the repair is to generate, next to or adjacent to surface 10is, a surface 616 which is frustoconical in form. The frustoconical surface is machined, taking care to achieve a surface finish corresponding to that specified for use with the seal to be used. Ideally, one should provide the best possible surface finish, preferably 32 RMS or better. The frustoconical surface should have an included angle of 120°. Hand polishing may be necessary. At this point, it may be desirable to perform an ultrasound scan or other inspection to assure integrity of the laminated composite material in the region.

Figure 7:
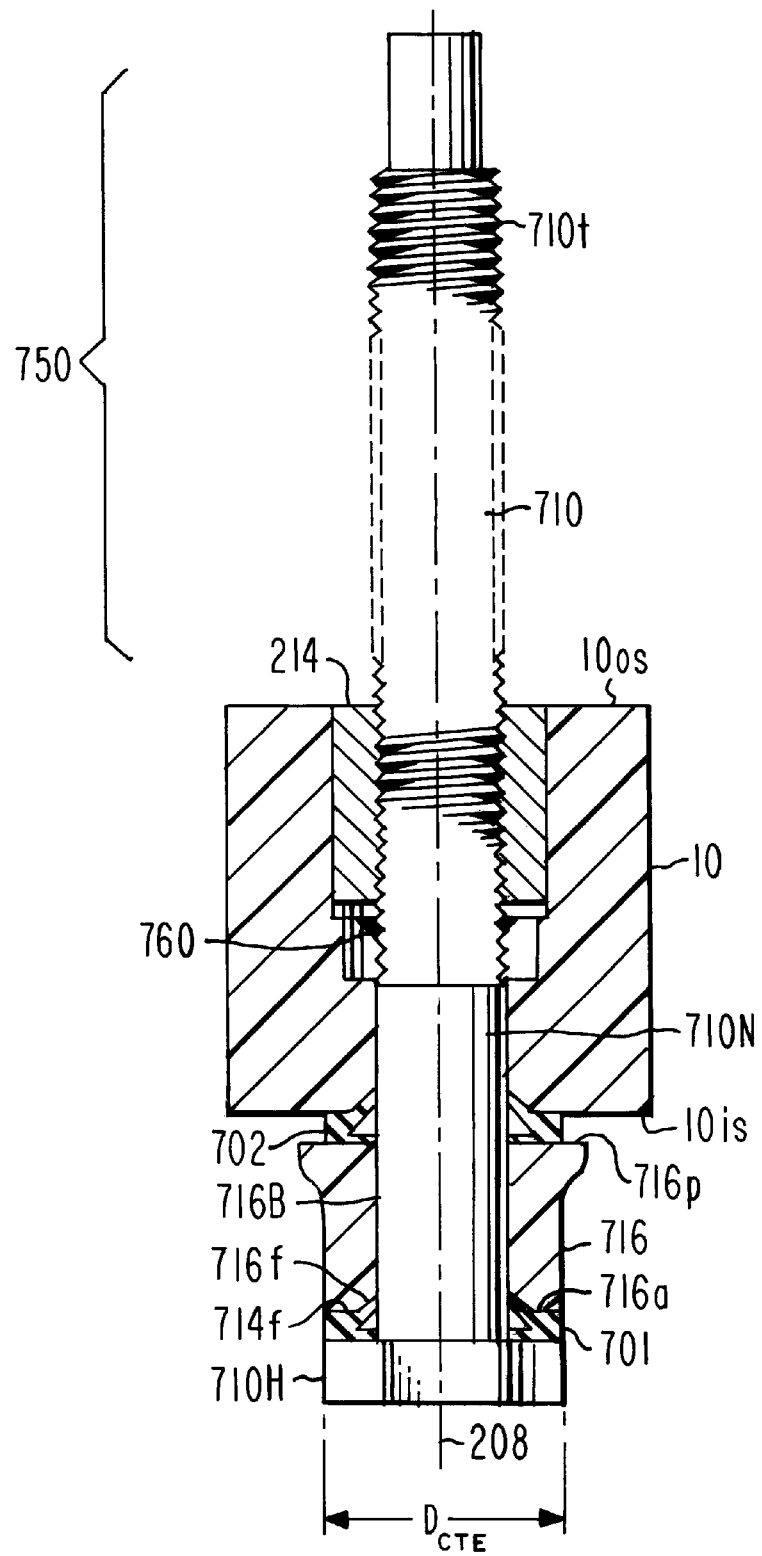
FIG. 7 is a simplified cross-sectional view of a laminated composite structure after repair according to an aspect of the invention.

Following the step illustrated in conjunction with FIG. 6c, the repair continues with procuration of a bolt 710 having a nonthreaded shank portion 710N adjacent the head 710H, and a threaded portion 710t remote from the head 710H, as illustrated in FIG. 7.

This bolt may be made from steel, and preferably has a polished non-threaded shank surface. The procedure involves procuring a pair of conventional hydraulic-sealing "k" seals, which are available from Sierracin Harrison, 3020 Empire Avenue, Burbank, Calif. 91504. A first k seal 701 is placed on the bolt adjacent the head 710H, with the flat portion of the seal adjacent the head, and the frustoconical portion facing away from the head, as illustrated in FIG. 7. Next, a CTE compensation collar 716 is assembled to the bolt 710. The CTE collar includes a bore 716B which is concentric with axis 208, a first planar end surface 716p, and a second planar end surface. The second planar end surface of collar 716 differs from those described by Wright only in that it includes a frustoconical surface 716f depressed below the surface of the planar end, whereby the planar end is reduced to a planar annulus 716a. The body of k seal 701 is sandwiched between planar annulus 716a and head 710H when the frustoconical portion 714f of the first k seal 714 is properly located adjacent frustoconical surface 716f. A further or second k seal 702 is placed over the nonthreaded portion 710N of the bolt 710, with its planar surface adjacent planar surface 716p of collar 716. Cleaning of all of the mating surfaces is appropriate as required during the assembly. This completes an assembled bolt, ready to be threaded through insert 214. Before the final insertion of the assembled bolt into the threaded insert, a final cleaning of the surfaces may be performed, and adhesive may be added to the thread portion of either the bolt 710 or the insert 214. The amount of adhesive should be a coating which fully fills the roots of the threads and just covers the tops of the male threads.

The assembled bolt as illustrated in FIG. 7 is started into the aperture adjacent the inner surface 10is of the tank, and engagement of the threads is started. When the thread engagement is several turns, the k seal seat area should be cleaned of adhesive. If the adhesive is Hysol EA9394, manufactured by Dexter Hysol, P.O. Box 312, 2850 Willow Pass Road, Pittsburg, Calif. 94565-0031, a cotton-tipped stick ("Q-TIP") may be dampened with acetone and used to clean the area of excess adhesive. The bolt is tightened into the threaded insert until the k seals begin to seat. The proper positioning of the seals relative to the mating surfaces should be verified. With a torque wrench, the bolt is torqued to the desired loading. When fully torqued, a stud portion 750 of bolt 710 extends above the outer surface 10os of the composite material of plate 10.

In a particular application, the thickness of the composite material in the repair region is 0.935", the threaded insert has an axial length of 0.437," and a 24 threads-per-inch threaded length of 0.367." The bolt has a total length of 3.075 inches, and an unthreaded shank diameter of 0.3110 to 0.3120 inch, polished to at least 16 RMS. In this application, the CTE collar had an axial length of 0.4 inch, and was made from INVAR. A 5/16" diameter seal is used with this bolt.

Figure 1A:
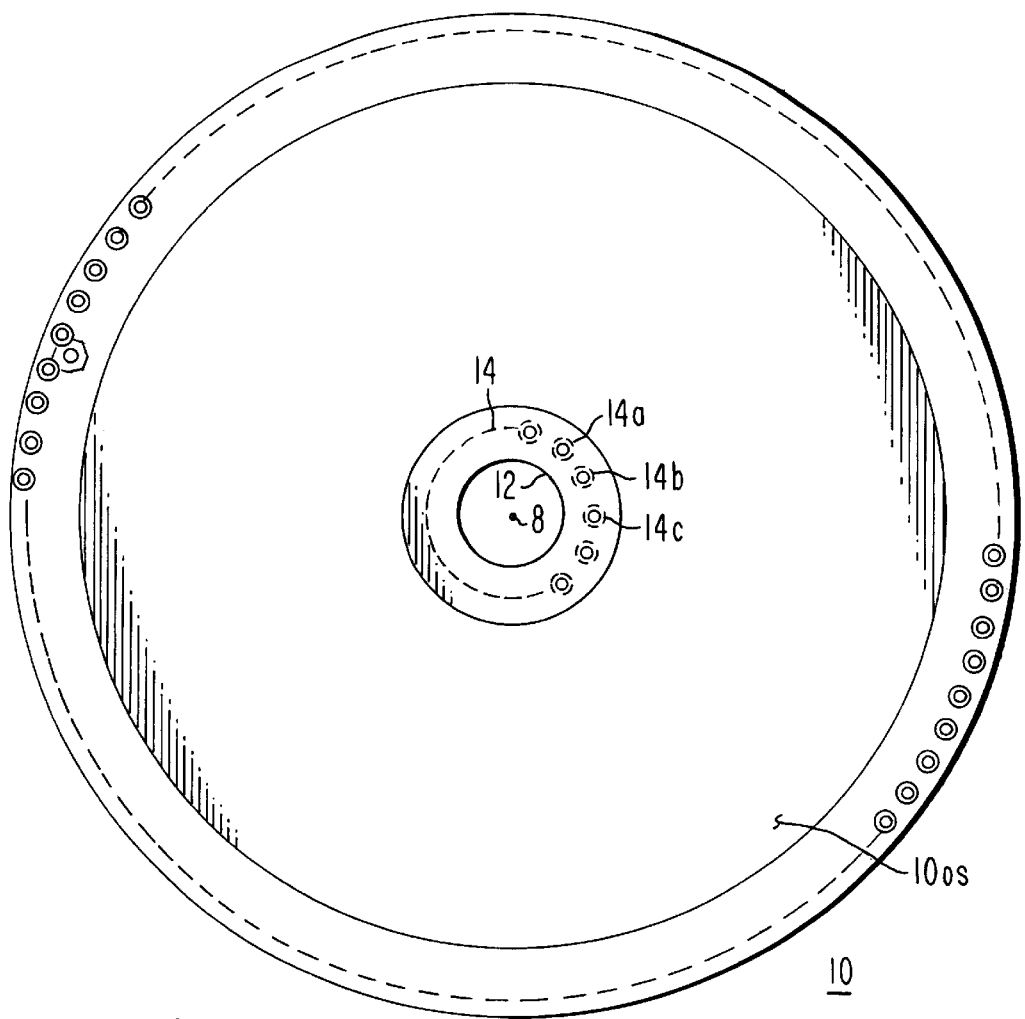
FIG. 1a is a simplified plan view of the top of a tank, illustrating a region about an aperture in which a prior-art ring of threaded apertures allow bolts to be attached for fastening of a cover plate or flange to the aperture.
Figure 1B:
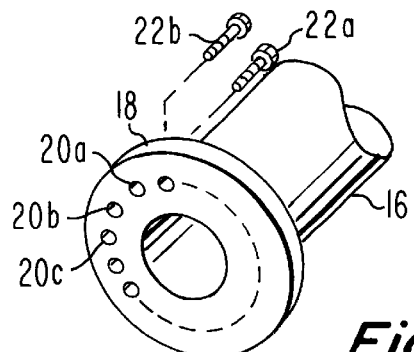
FIG. 1b is a simplified perspective or isometric view of a portion of a pipe with a flange, and bolts, adapted to be coupled to the aperture and ring of threaded apertures.

The described bolt/stud can be used in the same manner as the prior art arrangement of FIGS. 1a and 1b, except that corresponding nuts must be used instead of the bolts 22a, 22b, . . . . The preload applied to the joint compresses the laminated composite material and thereby tends to prevent delamination, and the preload also compresses the seals to prevent leakage of propellant, even over a range of temperatures ranging from cryogenic to above room temperature.

Two plates with repaired fasteners were tested, one with two fasteners repaired, and one with twenty repaired fasteners. Three cycles of full-flight mechanical and pressure loads were applied without any structural failure or leakage. Due to the compressive preload associated with the structure of FIG. 7, delamination damage to the composite material is less likely than with the prior-art arrangement of FIGS. 1a and 1b. By using the described method and apparatus, or its equivalent for the case of new manufacture, a stronger structure results than that of the prior art, and sealing appears to be adequate. The threaded insert, steel bolt, and k seals are essentially conventional, and the CTE collar is simple to fabricate, especially considering that for a given tank, only one, or only a few composite thicknesses will be involved, and therefore only one, or only a corresponding few, different versions of the CTE collar will be required, so they may be made by limited-mass-production methods.

Naturally, the described method can be adapted for original manufacture rather than repair. For original manufacture, the same general structure is achieved, although the order of drilling and mounting of the threaded insert may vary, as the through aperture may be formed before the threaded insert is inserted.

While the invention arose in the context of composite propellant tanks for spacecraft, it is not limited to such, but may be used for any situation in which a fastener seal is desired against fluid leakage in the context of a cryogenic or even a very cold or very hot fluid which might cause sufficient expansion or contraction to affect the performance of the seal, as described in conjunction with FIGS. 8–12.

Figure 8:
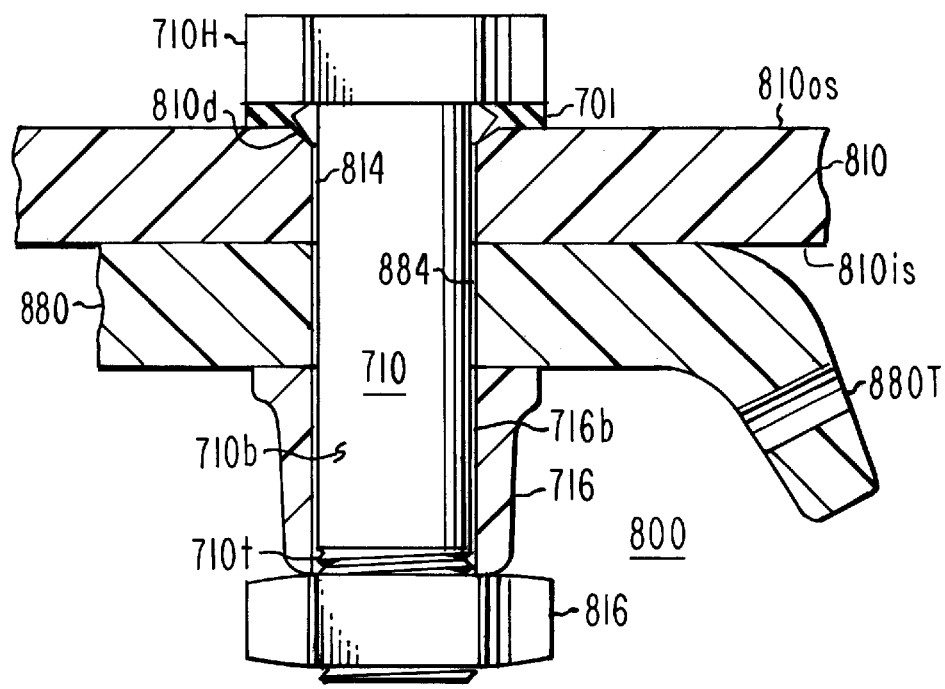

FIG. 8 illustrates a cross-section of a structure including a fluid barrier 810 having an outer surface 810os, for maintaining a cryogenic fluid contained adjacent inside surface 810is. A structural member illustrated as a lug 880 is to be bolted to the inner surface 810is of barrier 810. Barrier 810 and structural member 880 may both be made from composite materials, or either may be made from composite, or neither. In FIG. 8, the body of a bolt 710, similar or identical to that of FIG. 7, extends through a through aperture 814 in barrier 810, and also extends through a further through aperture 884 in a structural member 880. A CTE compensation collar 716 mounted adjacent to the lower surface (as seen in FIG. 8) of structure 880 and over the protruding shank of bolt 710. A nut 816 is threaded onto the threaded portion of bolt 710, and tightened to the desired torque. As illustrated in FIG. 8, sealing is accomplished by a k seal 701 bearing on the flat portion of head 710H of bolt 710, and also bearing on an annular depression 810d defined at the junction of plane of the outer surface 810os with the through aperture 814. Naturally, the depression and bolt must meet the standards for the particular type of seal being used. The arrangement of FIG. 8 may be used to fasten a structure to a barrier 810 of composite materials, or to a metallic or other barrier. Structural part 880 is securely held to the containment barrier notwithstanding the temperature, as in the structures described above, with a force equal to the force which clamps the seal. Leakage is minimized by the seal and associated structure including the CTE collar 716. The structural part 880 may include a through aperture 880T to which other structures may be bolted.

Figure 9:
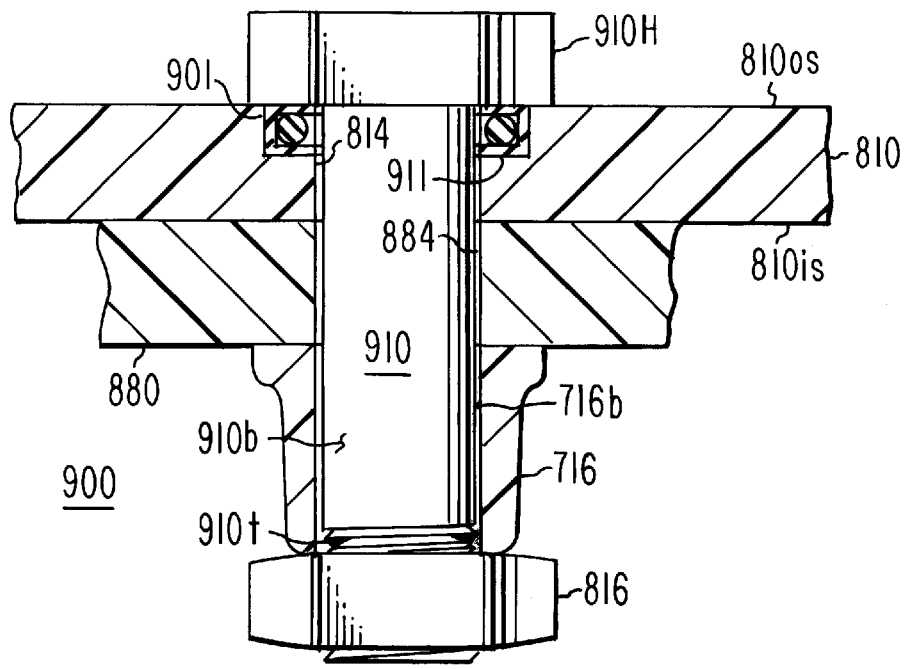

The arrangement of FIG. 9 is similar to that of FIG. 8, with the exception that the type of seal is different. In FIG. 9, a hypothetical ring seal uses a spring-loaded gasket. Many seals of this sort are available on the market. The bolt is designated as 910 rather than 710, because its head 910H may have specifications differing from those of bolt 710 because of the differing requirements of seal 901. Similarly, the depression in barrier 810 provided for the seal 901 may differ from that provided for a k seal, so the depression is designated 911. Note that the area in which the bolt head contacts the seal in FIG. 9 differs from the corresponding area in FIG. 8.

Figure 12:
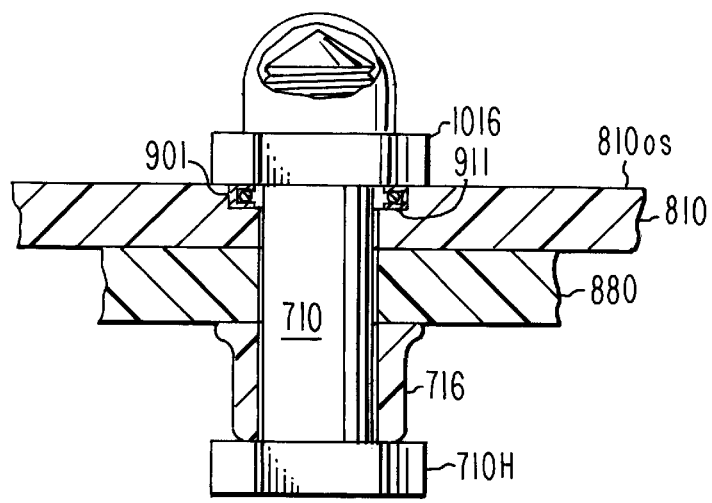
FIGS. 8–12 are cross-sections of fasteners employing seals and CTE collars in accordance with other aspects of the invention.
Figure 10:
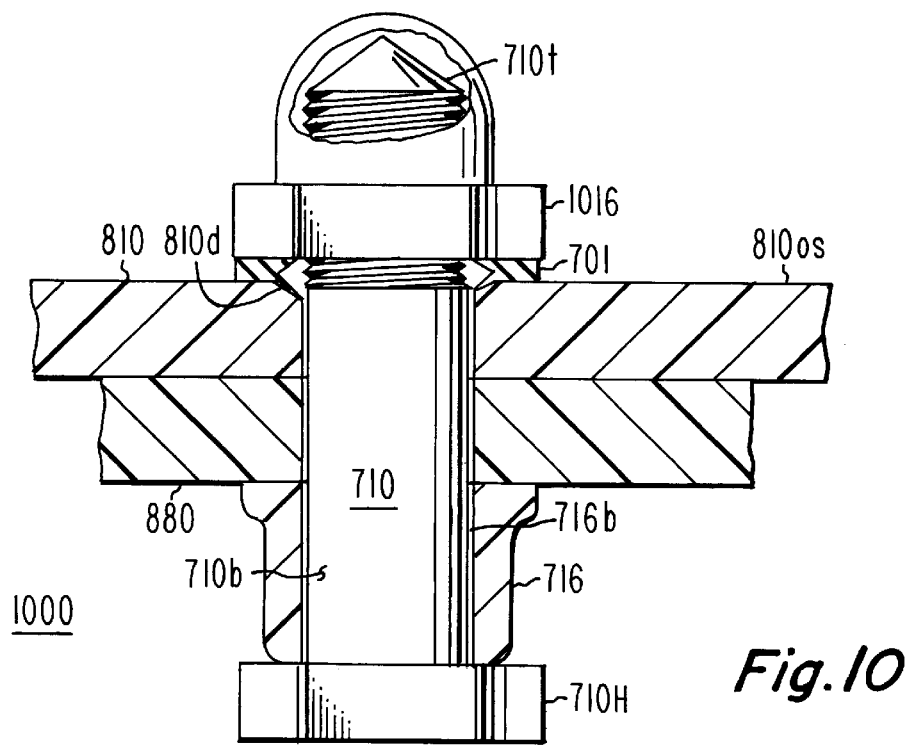
Figure 11:
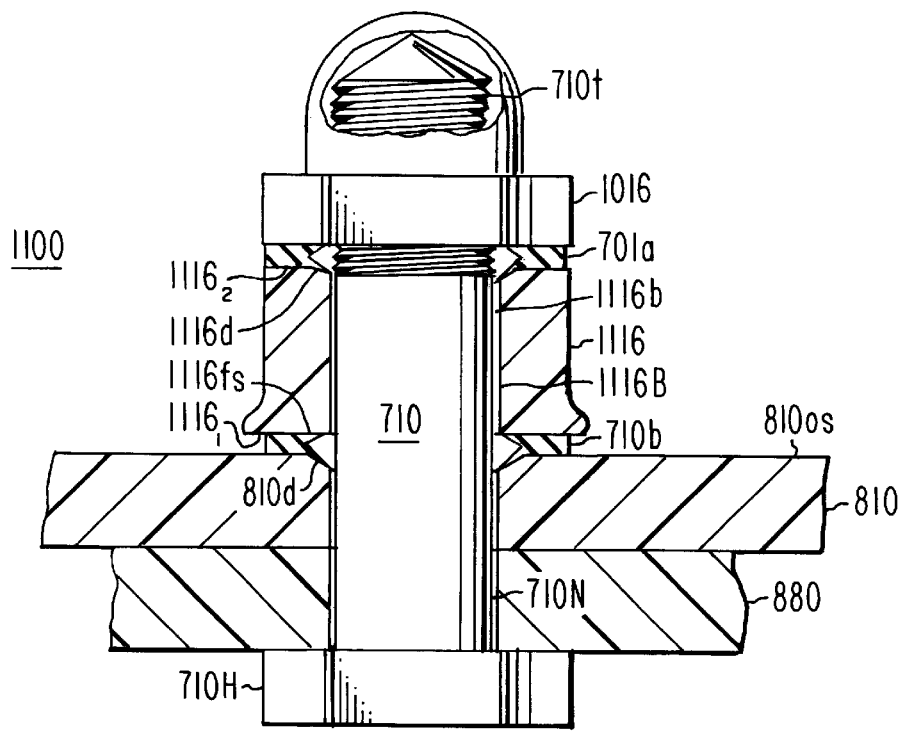

FIGS. 10, 11, and 12 illustrate the use of cap or acorn nuts in cryogenic sealing applications. Such arrangements can relieve assembly difficulties arising from difficult workspaces or from parts with unusual shapes.

The arrangement of FIG. 10, is equivalent to that of FIG. 8, except that the direction of penetration of the bolt is reversed, and the nut is a cap nut rather than a standard annular nut. This requires that the cap nut 1016 have surfaces adjacent the seal 701 which comport with the standards required for the seal.

In FIG. 11, all of the "pieces" of hardware except the bolt itself are assembled from the exterior of the container. In FIG. 11, the containment barrier 810, structural part 880, bolt 710, and cap or acorn nut 1016 are identical to those of FIG. 10 (except possibly as to the length of the bolt). As in the case of FIG. 10, a k seal designated 701*b* is located in depression 810*d*. A seal to the upper surface of seal 701*b* requires that the mating surface 1116*fs* of CTE collar 1116 meet the seal finish requirements. Even when seal 701*b* is interposed between the outer surface 810*os* of barrier 810 and CTE collar 1116, however, sealing is not complete, as fluid may flow through interstice between the bore 1116B of the collar 1116 and the outer surface of the shank 710N of bolt 710. Flow through this path is prevented by the combination of an additional seal 701*a* at the upper end of CTE collar 1116 together with the cap nut 1016. More particularly, the junction of the upper portion of the bore 1116B of the CTE collar 1116 with the upper surface thereof is provided with an annular depression 1116*d*, meeting the specifications for use with seal 701*a*. Similarly, the lower surface of cap nut 1016 must be finished to satisfy the seal specifications. This combination of two seal locations completely seals the bolt against substantial leakage.

In FIG. 12, the bolt 710 penetrates the through holes in structural part 880 and containment barrier 810 from the interior of the containment vessel. A CTE collar 716 lies adjacent bolt head 710H, and bears on the lower surface of structural element 880. Sealing is accomplished by means of a spring seal similar to 901 of FIG. 9, seated in a depression 911 in the upper surface of containment barrier 810. Of course, the depression 911 must meet the standards associated with the seal. Similarly, the surfaces of cap nut 1016 mating with seal 901 must meet the required standards for sealing.

Other embodiments of the invention will be apparent to those skilled in the art. For example, while the top portion 10 of the tank is circular and centered on the center of aperture 12, the tank top may have a noncircular shape, and if circular may be centered at some other location. As described in the Wright patent application, multiple CTE collars may be used, if desired. While the bolt heads have not been illustrated as countersunk, either the bolt heads or the nuts, or both, may be countersunk below the adjacent surface.

Thus, a method according to an aspect of the invention is for fastening a threaded stud (750) to project above a first surface (10*os*) of a laminated composite (10) in a substantially leakproof manner as to cryogenic liquid fluids. The laminated composite (10) structure is undesirably subject to crushing above a predetermined pressure and delamination under excessive tension perpendicular to the plies. The method comprises the step of forming a through aperture (215, 614) through the composite material (10) at the location at which the stud (750) is to be installed. The through aperture (215, 614) should have a first diameter (D) adjacent the first surface (10*os*) of the composite laminate (10), a frustoconical surface (616) in the form of the frustum of a cone lying adjacent a second surface (10*is*) of the composite laminate, and a second diameter (d), smaller than the first diameter (D), in a region lying between the frustoconical surface and the portion of the aperture having the first diameter. An internally threaded insert (214) is installed from the first side or first surface (10*os*) into the through aperture (215, 614) so as to fasten the insert (214) within the portion of the aperture having the first diameter (D). A bolt (710) is obtained which includes a head (710H), a nonthreaded shank portion (710N) adjacent the head (710H), and a threaded portion (710*t*) remote from the head (710H). The threaded portion (710*t*) of the shank should mate with the internal threads (214*t*) of the insert (214). The bolt (710) is made from a material (steel in the example) having a known coefficient of thermal expansion which is less than or lower than the coefficient of thermal expansion of the laminated composite structure (carbon-fiber-reinforced polymer in the example). A generally cylindrical collar (716) is obtained. The collar (716) should be made from a material (INVAR in the example) having a particular coefficient of thermal expansion and a thickness or length in an axial (208) direction. In one particular embodiment of the invention, the coefficient of thermal expansion of the collar (716) is ideally near zero. The collar (716) so obtained should have a bore (716B) about its axis (208) no greater in diameter than the diameter of the nonthreaded shank portion (710N) of the bolt (710), and the collar (716) should also have an overall diameter ($D_{cte}$) about the axis (208) which is no less than the diameter ($D_c$) of the cone (616) adjacent the second surface (10*is*) of the laminated composite (10). The collar (716) should further have a planar first end surface (716*p*) orthogonal to the axis (208), and a second end surface (716*f*, 716*a*). The second end surface (716*f*, 716*a*) should include a peripheral planar annulus (716*a*) parallel with the surface (716*p*) of the first end of the collar (716), and also include a depressed frustoconical portion (716*f*) in the shape of the frustum of a cone depressed below the planar annulus (716*a*). According to an aspect of the method, a first k seal (701) is assembled onto the bolt (710), with the conical or frustoconical portion of the first k seal (702) facing away from the head (710H) of the bolt (710). The collar (716) (or a plurality of such collars) is then assembled onto the bolt (710), with the depressed portion (716*f*) of the collar (716) facing the first k seal (701). A second k seal (702) is placed on the bolt (710), with the conical portion of the second k seal (702) facing away from the first surface (716*p*) of the collar (716), to thereby generate an assembled bolt (710, 701, 716, 702). The assembled bolt (710, 701, 716, 702) is inserted through the aperture (215, 614) from the second side (10*is*) of the laminated composite (10), and threaded through the insert (214), so as to cause a stud portion (750) of the threaded portion (710*t*) of the bolt (710) to protrude from the first side (10*os*) of the laminated composite (10). In that case in which the coefficient of thermal expansion of the collar (716) is selected in conjunction with the coefficient of thermal expansion of the bolt (710) and with the thickness of the laminated composite (10) in such a manner that the pressure applied to the laminated composite (10) by the bolt (710) does not change substantially over the expected temperature range, the bolt (710) is torqued into the insert (214) to achieve a pressure in the laminated composite (10) which is less than the pressure at which the composite laminate crushes. The torque should be sufficient to deform the k seals sufficiently to seal against the pressure of the propellant inside the tank when the tank is filled.

In a particular mode of the method, the aperture (215, 614) in the laminated composite (10) is formed by drilling from one of the first (10os) and second (10is) sides, and the laminated composite (10) is supported from the other one of the first (10os) and second (10is) sides to aid in preventing delamination during the drilling. In another mode, the drilling is accomplished at the slowest drill feed rate at which reasonable cutting occurs, in order to reduce drill thrust loading. In another mode, the frustoconical portion (616) of the aperture (215, 614) is formed to a 120E included angle, and the collar (716) includes a conical bore (716B) portion with a 120E total included angle. The depressed conical portions (616, 716f) are preferably polished. In one version, a countersunk region (618) surrounds the conical portion (616) of the aperture (215, 614). Adhesive (760) is preferably placed on the threads (214t, 710t) before the bolt (710) is threaded into the insert (214). Before the bolt (710) is torqued, it may be desirable to clean at least the frustoconical portion (616, 716f) of one of the aperture (215, 614) and a corresponding conical portion of the second k seal (702). The adhesive, if any, should be cleaned from exposed portions of the threads.

A structure (FIG. 7) according to an aspect of the invention includes a laminated composite (10) with a threaded stud (750) extending from a first side thereof. The structure includes a through aperture (215, 614) in the laminated composite (10). The through aperture (215, 614) defines an axis (208), and includes a first portion (215) adjacent the first side (10os) of the laminated composite (10). An internally threaded (214t) insert (214) is fastened in the first portion (215) of the through aperture (215, 614). The through aperture (215, 614) further includes a second portion (614) adjacent a second side (10is) of the laminated composite (10). The second portion (614) has a frustoconical surface (a surface in the form of a portion of a cone) (616) depressed below the second surface (10is) of the laminated composite (10). The structure (FIG. 7) includes an annular collar (716) defining an axial bore (716B) coaxial with the axis (208), a first end surface (716p) surface perpendicular to the axis (208), and a second end (716f, 716a) defining a planar annulus (716a) centered on the axis (208). The collar (716) also defines a frustoconical surface (716f) depressed below the second end annulus (716a). A bolt (710) includes a head (710H), a nonthreaded shank portion (710N) adjacent the head (710H), and a threaded portion (710t) remote from the head (710H). The bolt (710) is assembled with the laminated composite (10) in a manner which is coaxial with the aperture (215, 614), the collar (716), and two k seals (701, 702) having frustoconical surfaces. The parts are assembled so that (a) the first k seal (701) lies between the head (710H) and the second end (716a, 716f) of the collar (716), with the frustoconical portion of the first k seal mated with the depressed frustoconical surface (716f) of the collar (716), (b) the second k seal (702) lies between the first end surface (716p) of the collar (716) and the frustoconical surface (616) of the second portion (614) of the through aperture (215, 614), with the frustoconical portion of the second k seal (702) mated with the frustoconical surface (616) of the second portion (614) of the through aperture (215, 614), and (c) the threaded portion (710t) of the bolt (710) threaded through the internally threaded insert (214) sufficiently to extend (750) above the first surface of the laminated composite (10).

In a particular version of the structure, the material of the laminated composite (10) has a coefficient of thermal expansion which exceeds that of the material of the bolt (710), so that the pressure exerted by the bolt (710) on the laminated composite (10) will tend to increase with increasing temperature. In this embodiment, the collar(s) (716) is (a) made from a material, and (b) has a length selected (i) in conjunction with the length of the bolt (710) lying within the laminated composite (10), (ii) the material of the bolt (710), and (iii) the material of the laminated composite (10), so that the pressure applied to the laminated composite (10) by the combination of the bolt (710) and the collar (716) tends to remain constant with temperature. In one embodiment, the collar (716)(s) may have a coefficient of thermal expansion near zero. In this particular version of the structure, the bolt (710) is torqued sufficiently to apply pressure to the laminated composite (10) which is less than that pressure at which the laminated composite (10) crushes. The pressure will remain more or less constant over the temperature range from room temperature to cryogenic temperatures.

A further avatar of the structure comprises adhesive (760) lying in the interstice between the internal threads (214t) of the insert (214) and the threads (710t) of the bolt (710). In a preferred embodiment, the unthreaded portion (710t) of the shank of the bolt (710) is polished. Also, at least one of the depressed frustoconical surface of the collar (716) and the depressed frustoconical surface (616) of the aperture is polished. A region (618) surrounding the frustoconical surface (616) of the aperture (215, 614) may be countersunk below the second surface (10is) of the laminated composite (10).

In a yet further avatar of the invention, a bolted structure (800, 900, 1000, 1100) includes a containment barrier (810) defining a containment vessel suitable for use with cryogenic fluids. The containment barrier (810) further defines first (810is) and second (810os) surfaces, and a through aperture (814) extending between the first (810is) and second (810os) surfaces. The through aperture (814) is dimensioned to clear the shank (710b, 910b) of a bolt (710, 910). The bolt (710, 910) includes a head (710H, 910H), an unthreaded shank portion (710b, 910b), and a threaded shank (710t, 910t) portion. The bolt (710, 910) extends through the through (814) aperture from one of the first (810is) and second (810os) surfaces in such a manner that at least the threaded portion (710t, 910t) of the bolt (710, 910) protrudes past the other one of the first (810is) and second (810os) surfaces. The bolted structure (800, 900, 1000, 1100) also includes a CTE collar (716, 1116) including a bore (716b, 1116b) having a diameter selected to clear the shank (710b, 910b) of the bolt (710, 910). The bore (716b, 1116b) of the collar (716, 1116) is penetrated by at least a portion of the shank (710b, 910b) of the bolt (710, 910). A nut (816, 1016) is threaded onto at least a portion of the threaded portion (710t, 910t) of the bolt (710, 910), and the nut (816, 1016) is torqued relative to the bolt (710, 910) to provide a predetermined tension in the shank (710b, 910b) of the bolt (710, 910). The bolted structure (800, 900, 1000, 1100) also includes one of (a) a seal (701, 901) interposed between, and in immediate contact with, the head (710H, 910H) of the bolt (710, 910) and that portion (810d, 911) of the one (810os) of the first (810is) and second (810os) surfaces of the barrier (810) which meets sealing standards for the seal (701, 901);

(b) a seal (701) interposed between, and in immediate contact with, the nut (1016) and that portion of the one (810os) of the first (810is) and second (810os) surfaces which meets sealing standards for the seal (701); and (c) a first seal (701b) interposed between an end surface (1116$_1$) of the collar (1116) and that portion (810d) of one of (810os) the first (810is) and second (810os) surfaces which meets sealing standards for the seal (701b); and a second seal (701a) interposed between a second end surface (11162) of the collar (716, 1116) and a surface portion of another structure (1016).

What is claimed is:

1. A structure including a laminated composite with a threaded stud extending from a first side thereof, said structure comprising:

a through aperture in said laminated composite, said through aperture defining an axis, said aperture including a first portion adjacent said first side of said laminated composite in which an internally threaded insert is fastened, said through aperture further including a second portion adjacent a second side of said laminated composite, said second portion having a frustoconical surface depressed below said second side of said laminated composite;

an annular collar defining an axial bore coaxial with said axis, a first end surface perpendicular to said axis, and a second end defining a planar annulus centered on said axis, and also defining a frustoconical surface depressed below said second end annulus;

a bolt including a head, a nonthreaded shank adjacent said head, and a threaded portion remote from said head, said bolt being assembled with said laminated composite coaxial with said aperture, said collar, and first and second k seals having frustocoflical surfaces so that (a) said first k seal lies between said head and said second end of said collar, with said frustoconical surface of said first k seal mated with said depressed frustoconical surface of said collar, (b) said second k seal lies between said first end surface of said collar and said frustoconical surface of said second portion of said through aperture, with said frustoconical surface of said first k seal mated with said frustoconical surface of said second portion of said through aperture, and (c) said threaded portion of said bolt threaded through said internally threaded insert sufficiently to extend above said first side of said laminated composite.

2. A structure according to claim 1, further comprising adhesive lying in the interstice between the internal threads of said insert and said threads of said bolt.

3. A structure according to claim 1, wherein said unthreaded portion of said shank of said bolt is polished.

4. A structure according to claim 1, wherein at least one of said depressed frustoconical surface of said collar and said depressed frustoconical surface of said aperture is polished.

5. A structure according to claim 1, further comprising a region surrounding said frustoconical surface of said aperture which is countersunk below said second surface of said laminated composite.

6. A structure according to claim 1:

wherein the material of said laminated composite has a coefficient of thermal expansion which exceeds that of the material of said bolt, so that the pressure exerted by said bolt on said laminated composite will increase with increasing temperature;

wherein said collar is (a) made from a material, and (b) has a length selected (i) in conjunction with the length of said bolt lying within said laminated composite, (ii) the material of said bolt, and (iii) the material of said laminated composite, so that the pressure applied to said laminated composite by the combination of said bolt and said collar tends to remain constant with temperature; and wherein said bolt is torqued sufficiently to apply pressure to said laminated composite which is less than that pressure at which said laminated composite crushes.

7. A bolted structure including:

a containment barrier defining a containment vessel suitable for use with cryogenic fluids, said containment barrier further defining first and second surfaces, and a through aperture extending between said first and second surfaces, said through aperture being dimensioned to clear the shank of a bolt;

a bolt including a head, an unthreaded shank portion, and a threaded shank portion, said bolt extending through said through aperture from one of said first and second surfaces in such a manner that at least said threaded portion of said bolt protrudes past the other one of said first and second surfaces;

a CTE collar including a bore having a diameter selected to clear said shank of said bolt, said bore of said collar being penetrated by at least a portion of said shank of said bolt;

a nut threaded onto at least a portion of said threaded portion of said bolt, said nut being torqued relative to said bolt to provide a predetermined tension in said shank of said bolt; and one of (a) a first seal interposed between, and in immediate contact with, said head of said bolt and that portion of said one of said first and second surfaces of said barrier which meets sealing standards for said first seal;

(b) a second seal interposed between, and in immediate contact with, said nut and that portion of said one of said first and second surfaces which meets sealing standards for said second seal; and (c) a third seal interposed between an end surface of said collar and that portion of one of said first and second surfaces which meets sealing standards for said third seal; and a fourth seal interposed between a second end surface of said collar and a surface portion of another structure.

* * * * *